Inventor
Granville A. Humason.
By
E. V. Hardway
Attorney

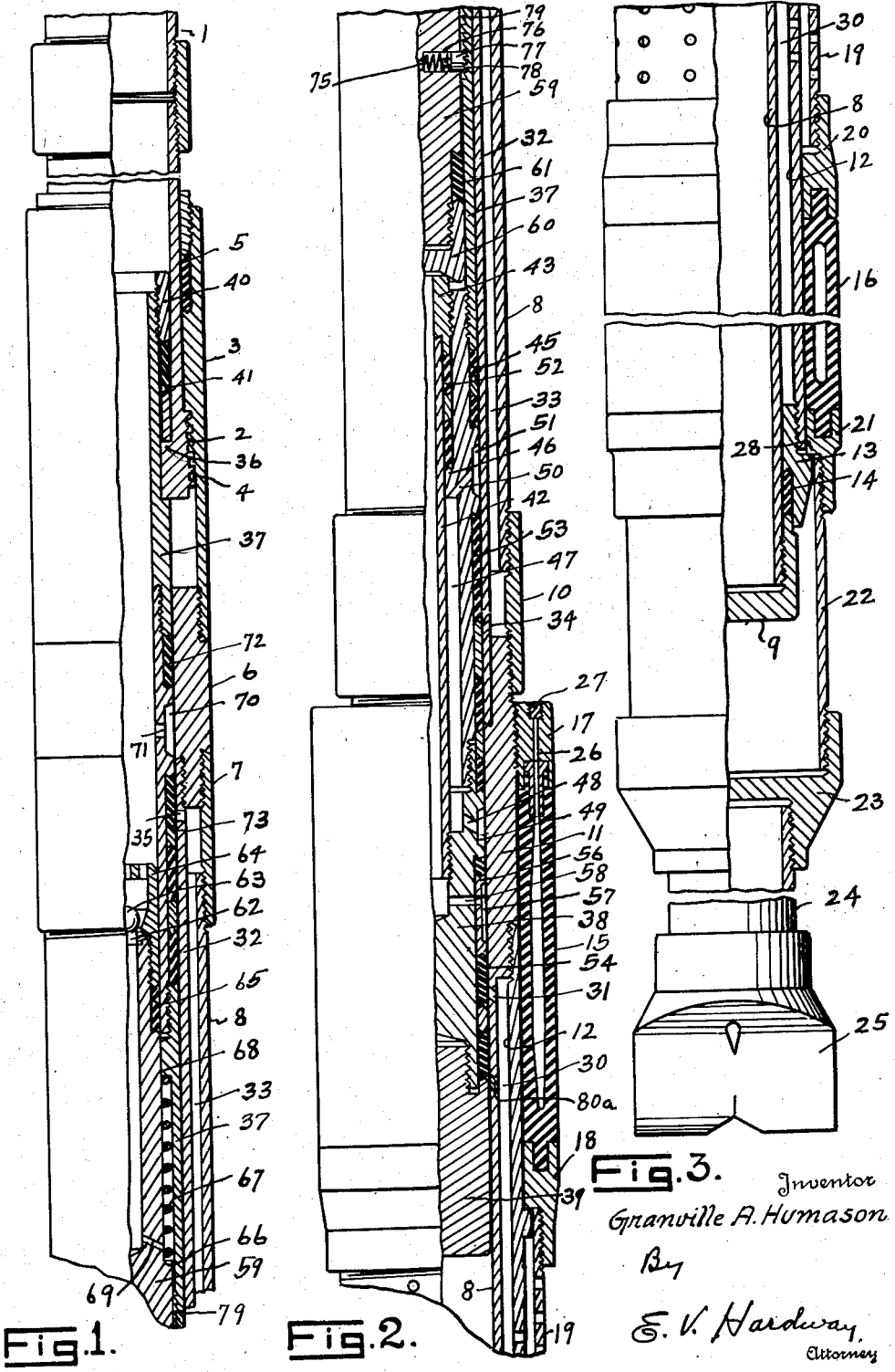

Aug. 21, 1951    G. A. HUMASON    2,565,130
COMBINED TESTER AND PRESSURE GAUGE
Filed June 23, 1945    5 Sheets-Sheet 3

Inventor
Granville A. Humason.
By E. V. Hardway
Attorney

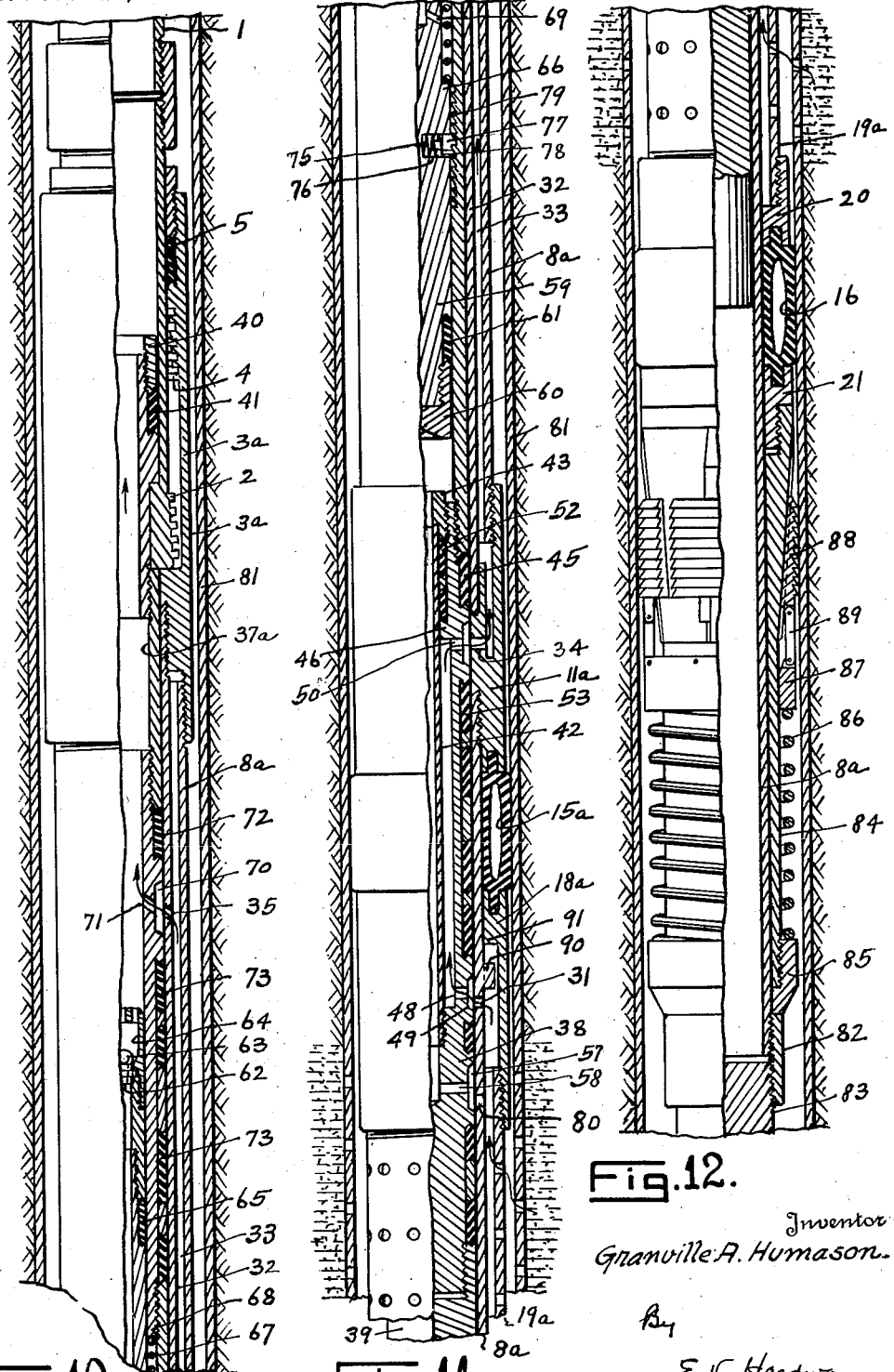

Aug. 21, 1951  G. A. HUMASON  2,565,130
COMBINED TESTER AND PRESSURE GAUGE
Filed June 23, 1945  5 Sheets-Sheet 5

Inventor
Granville A. Humason.

By
E. V. Hardway,
Attorney

Patented Aug. 21, 1951

2,565,130

UNITED STATES PATENT OFFICE 2,565,130

COMBINED TESTER AND PRESSURE GAUGE

Granville A. Humason, Houston, Tex., assignor of one-half to Edgar E. Townes, Jr., Houston, Tex.

Application June 23, 1945, Serial No. 601,148

4 Claims. (Cl. 166—11)

This invention relates to a combined tester and pressure gauge.

An object of the invention is to provide a well tool of the character described whereby the contents of well formation may be tested; that is whereby a sample of the fluid in the formation may be entrapped and brought to the ground surface for inspection.

It is another object of the invention to provide a testing tool of the character described wherein a sample of the fluid from the formation being tested may be entrapped and isolated so that it will not become contaminated with drilling fluid, or otherwise, while the sample is being taken and withdrawn.

It is a further object of the invention to provide a tool of the character described whereby a sample of the fluid from the well formation may be entrapped for withdrawal and the pressure of the fluid in the formation at the same time gauged.

A still further object of the invention is to provide a testing tool of the character described which is of such construction that the formation may be isolated from the strata above and beneath and fluid from the isolated formation may be allowed to flow into the operating string of pipe and on to the ground surface if the pressure is sufficient or, in the alternative, entrapped within the operating string for withdrawal to the ground surface and whereby a sample of said fluid may also be entrapped and isolated so as not to be contaminated with the drilling fluid, or otherwise, and withdrawn from the well for inspection.

With the above and other objects in view the invention has particular relation to certain novel features of construction, operation and arrangement of parts, examples of which are given in this specification and illustrated in the accompanying drawings, wherein:

Figures 1, 2 and 3 are side elevational views, partly in section, of the upper, intermediate and lower portions, respectively, of the tool with the parts in inactive position for going into an uncased well or for being withdrawn from the well.

Figures 10, 11 and 12 are side elevational views, partly in section, of the upper, intermediate and lower portions, respectively, of the tool as set in the casing of a well and in position to make a test.

Figures 4, 5, 6:
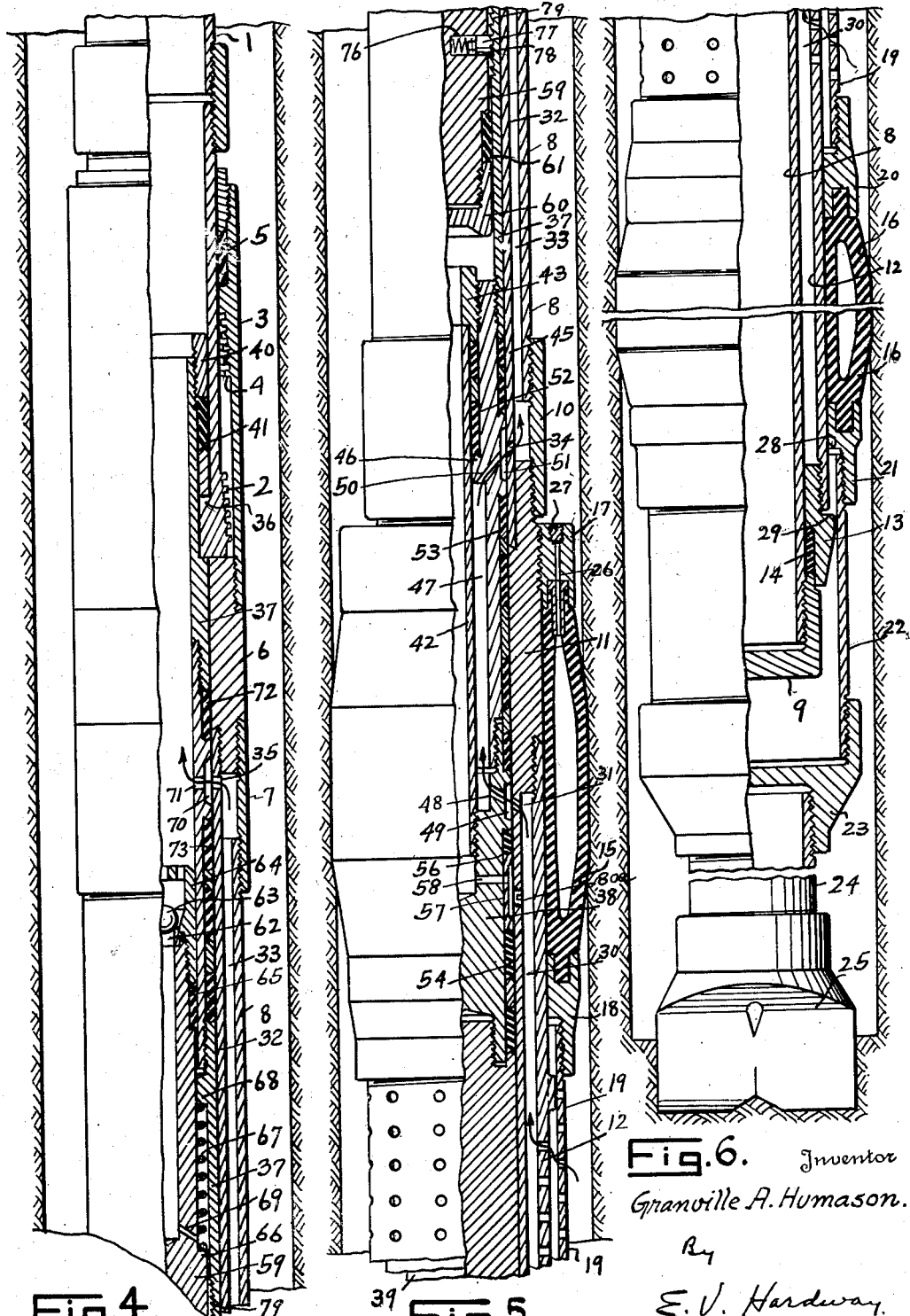
Figures 4, 5 and 6 are side elevational views, partly in section, of the upper, intermediate and lower portions, respectively, of the tool as set in an uncased well for making the test.

Referring now more particularly to the drawings wherein like numerals of reference designate the same parts in each of the figures, the numeral 1 designates a tubular operating string which extends to the ground surface and whose lower end has the external, coarse, mutilated threads 2.

This lower end of the operating string has an internal threaded connection with the elongated external coupling 3 which has the inside mutilated threads 4 arranged to intermesh with the threads 2. A suitable stuffing box 5 is carried by the upper end of the coupling 3 and closely surrounds the operating string 1.

The testing tool proper is connected to the lower end of the coupling 3 by means of the tubular nipple 6.

Connected to the lower end of the nipple 6, by means of an external collar 7, there is the depending tubular string of pipe 8 forming a jacket whose lower end is closed by the cap 9. This jacket 8 may be formed of upper and lower sections connected by the external coupling 10 and the upper end of the lower section is formed with the external thickened portion 11.

A tubular packer supporting element 12 has its upper end threaded to the lower end of the thickened portion 11 and screwed into the lower end of the packer supporting element 12 and closely surrounding the lower end of the jacket 8 there is a gland 13. Within this gland and forming a seal around the jacket there is a seal ring 14 which is retained in place by the cap 9, as shown in Figures 3 and 6.

Around the packer support 12 is the packer assembly which includes the upper and lower packers 15 and 16 spaced the required distance apart. The upper end of the upper packer 15 is attached to the metal ring 17 which is screwed onto the outwardly thickened portion 11 and the lower end of the packer 15 is suitably anchored to an annular coupling 18 which surrounds the packer support 12. This coupling 18 is screwed onto the upper end of a perforated connecting nipple 19.

Screwed onto the lower end of the nipple 19 there is an annular coupling member 20 which closely surrounds the packer support 12 and the upper end of the lower packer 16 is suitably anchored to the coupling 20. The lower end of the packer 16 is anchored to a coupling 21 which closely surrounds the packer support 12. There is a length of pipe 22 whose upper end is screwed into the lower end of the coupling 21 and the lower end of this pipe 22 is closed by a coupling 23. Depending from this coupling 23 there is a tubular stem 24 to which the anchor 25 is attached. This anchor has depending blades for engaging with the formation at the bottom of the well bore, as shown in Figures 3 and 6, and is provided for a purpose to be hereinafter stated.

That portion of the packer support 12 opposite the connecting nipple 19 is also perforated, as shown in Figures 1 and 2. The packers 15, 16 may be formed of rubber or other expansible material and, if desired, may be formed hollow so that they will more readily expand outwardly and contract inwardly when subjected to an endwise compressive force. As shown in Figures 2 and 5, the cavity within the packer 15 is provided with an inlet duct 26 which may be closed by a removable plug 27. When this plug is removed the chamber within the packer 15 may be filled with liquid and the plug 27 then replaced, so as to insure the expansion outwardly and contraction inwardly of the packer upon application of said endwise force. In a similar manner and for a similar purpose the cavity within the packer 16 may be filled with liquid.

The coupling 21 is provided with an internal, annular, downwardly facing shoulder 28 and the gland 13 has an external, annular, upwardly facing shoulder 29 arranged to interengage with the shoulder 28 so as to prevent the detachment of the packer assembly from the packer support 12. The tubular packer support 12 is spaced outwardly from the string 8 to provide the annular channel 30 for the inflowing fluid and the upper end of this channel has an inside port 31, as shown in Figures 2 and 5.

The numeral 32 designates a tubular, inside liner whose upper end is screwed into the lower end of the nipple 6 and whose lower end is fitted snugly within the upper end of the thickened portion 11, as shown in Figures 1 and 2, thus providing an enclosed entrapping chamber 33 between the liner and the outer string of pipe 8. This entrapping chamber is between the outer string of pipe 8 and the inner liner 32 and its lower end is provided with an inside port 34 and its upper end is provided with an inside port 35, said ports leading inwardly through the wall of the liner.

The lower end of the operating string of pipe 1 is provided with an inside, annular shoulder 36 and supported by this shoulder there is an inside string of pipe 37 whose lower end is closed by a cap 38 screwed thereon and a solid plug 39 is screwed into the lower end of this cap.

Screwed onto the upper end of the string 37 there is an external collar 40 which rests on a packing gland 41 and this gland, in turn, is supported on the shoulder 36 whereby to support the string 37.

Screwed into the upper end of the cap 38 and upstanding into the lower end of the string of pipe 37 there is a tubular pressure nipple 42 whose upper end is fitted up into an annular seat 43 which is threaded into the upper end of the lower inwardly thickened portion of the inner string of pipe 37.

A packing assembly 52 surrounds the upper end of the pressure nipple 42 and is confined between the internal, annular shoulder 46 of the inner string 37 and said annular seat 43 which forms a gland for compressing said packing assembly 45. The pressure nipple 42, beneath the packing assembly 45, is spaced inwardly from the string of pipe 37 forming an annular channel 47. The lower end of this channel is provided with an inlet port 48 leading inwardly from an external, annular groove 49 in the string 37 and the upper end of the channel 47 has an outlet port 50 leading into an external, annular channel 51 in the string 37. Around the string 37 above the channel 51 is a packing assembly 45 and around said string beneath the channel 51 is the packing assembly 53; also surrounding the cap 38 there is a packing assembly 54 which includes a metal ring 56 having a wide, external channel 57 therearound; and said ring and cap 38 are provided with a duct 58 leading inwardly through said ring and cap through which fluid may enter the lower end of the pressure nipple 42.

Fitted closely within the inner string 37, above the seat 43, there is a plunger 59, screwed onto the lower end of which there is a cap 60 and countersunk into which, above said cap, there is an external annular seal ring 61. The upper end of the plunger 59 is formed tubular and on its upper end is the annular valve seat 62 which is controlled by the upwardly opening valve 63 which is confined by the valve cage 64 which is screwed onto the tubular upper end of the plunger and which clamps the valve seat in place. Countersunk into the plunger is the upper, external, seal ring 65 which is maintained in place by the cage 64.

The plunger 59 has an external, annular, shoulder 66 whereon is seated a coil spring 67 which is located between the plunger and string 37 and whose upper end engages an internal, annular, shoulder 68 in said string 37. eLading inwardly through the wall of the tubular upper end portion of the plunger 59 into the interior thereof from the lower end of the space in which said spring 67 is located there is a duct 69.

Above the plunger there is an external, annular channel 70 in the string 37 and leading from this channel inwardly into the string there is a port 71.

Above the channel 70 and surrounding the string 37 and countersunk therein there is a seal ring 72 and beneath the channel 70 and surrounding said string 37 and countersunk therein there is the packing assembly 73.

Yieldingly mounted on a coil spring 75 in the radial bore 76 in the plunger there is a dog 77 whose outer end has the downwardly pitched ratchet teeth 78 arranged to engage corresponding upwardly pitched ratchet teeth 79 on the inside of the inner string of pipe 37.

The tool shown in Figures 1 to 6, inclusive, may be assembled as shown in Figures 1 to 3, inclusive, and let down into the well bore to be tested. The tubular stem 24 may be of any required length and in assembling the tool this stem should be of the required length to bring the perforated nipple 19 and the perforations of the tubular string pipe 8 opposite the stratum to be tested. When the anchor 25 lands on bottom the further downward movement of the pipe 22 will be stopped and upon further downward movement of the string of pipe 8 the upper and lower packers 15 and 16 will be subjected to an endwise compressive force expanding said packers outwardly against the walls of the well bore above and beneath the stratum to be tested, as shown in Figures 4 to 6, inclusive, thus sealing off the stratum to be tested.

The operating string 1 may then be given a quarter turn to the right thus disengaging the mutilated threads 2 from the threads 4 and allowing the operating string 1 to move downwardly relative to the tool until it lands on the upper end of the nipple 6, as shown in Figure 4. There will be a corresponding downward movement of the inside string of pipe 37 thus carrying the channel 49 downwardly into registration with the port 31 so that the fluid entering the pipe 8 may flow up through the channel 30 and through said registering ports into the string 37 around the pressure nipple 42; also the channel 51 will be brought into registration with the port 34 so that said fluid may flow out into the entrapping chamber 33 and the channel 70 will be brought into registration with the port 35 so that the fluid may flow on back into the inner string of pipe 37 and on up into the operating string 1 and thence to the ground surface if the well pressure is sufficient for that purpose. The course of the fluid upwardly, as hereinabove explained, is indicated by arrows in Figures 4 to 6, inclusive.

When the test has been completed the operating string 1 may be pulled upwardly thus elevating also the inside string of pipe 37 and, if desired, the threads 2 may be reengaged with the threads 4. When this is done the ports 31, 34 and 35 will be closed and the fluid in the operating string above will be entrapped therein; also the fluid in the sample entrapping chamber 33 will be sealed therein against the entrance of any contaminating matter. The tool may then be withdrawn to the ground surface and broken up to render the entrapped samples accessible for inspection.

There will usually be gas, under pressure, in the well and this gas will enter the channel 30 and pass through the duct 58 and enter the pressure stem 42 while the channel 57 is in registration with the port 31, as the pipe 37 moves downwardly, relative to the string of pipe 8. The pressure will elevate the plunger 59, compressing the spring 67. As the plunger 59 is elevated the teeth of the dog 77 will ratchet past the teeth 79 but said teeth will interengage to prevent the downward movement of the plunger 59 when the pressure is relieved. The strength of the spring 67 may be so regulated that the well pressure will be indicated by the elevation of the plunger. When the channel 57 passes the port 31 the pressure will be cut off from the pressure stem and plunger which may be ascertained when the tool is withdrawn from the well bore and broken up for sample inspection.

The pipe 8 is provided with a port 80 which communicates with the channel 57 and which is normally closed by the plug 80a. This plug may be removed if it be desired to expose the plunger to the pressure at all times while making the test. The plug will be removed for registering the well pressure, usually, only when said pressure is low.

In the embodiment illustrated in Figures 7 to 12, inclusive, means have been provided for anchoring the tool at any desired elevation in a cased well. In this embodiment there will be a casing 81 set in the well. It is common practice, after the casing is set, to perforate it at the producing stratum, as shown in Figures 8, 9, 11 and 12. The string of pipe 8a corresponds to and is substantially similar to the string of pipe 8, hereinabove described. On the lower end of the string of pipe 8a there is an external coupling 82 whose lower end is closed by the plug 83. Closely surrounding the lower end of the pipe 8a there is a tubular expander 84 whose upper end is externally flared and whose lower end is threaded into an external collar 85 which rests on the coupling 82.

Supported on the collar 85 and surrounding the lower end of the expander there is the coil spring 86 whose upper end supports a ring 87 which surrounds and is movable relative to the expander.

Figures 7, 8, 9:
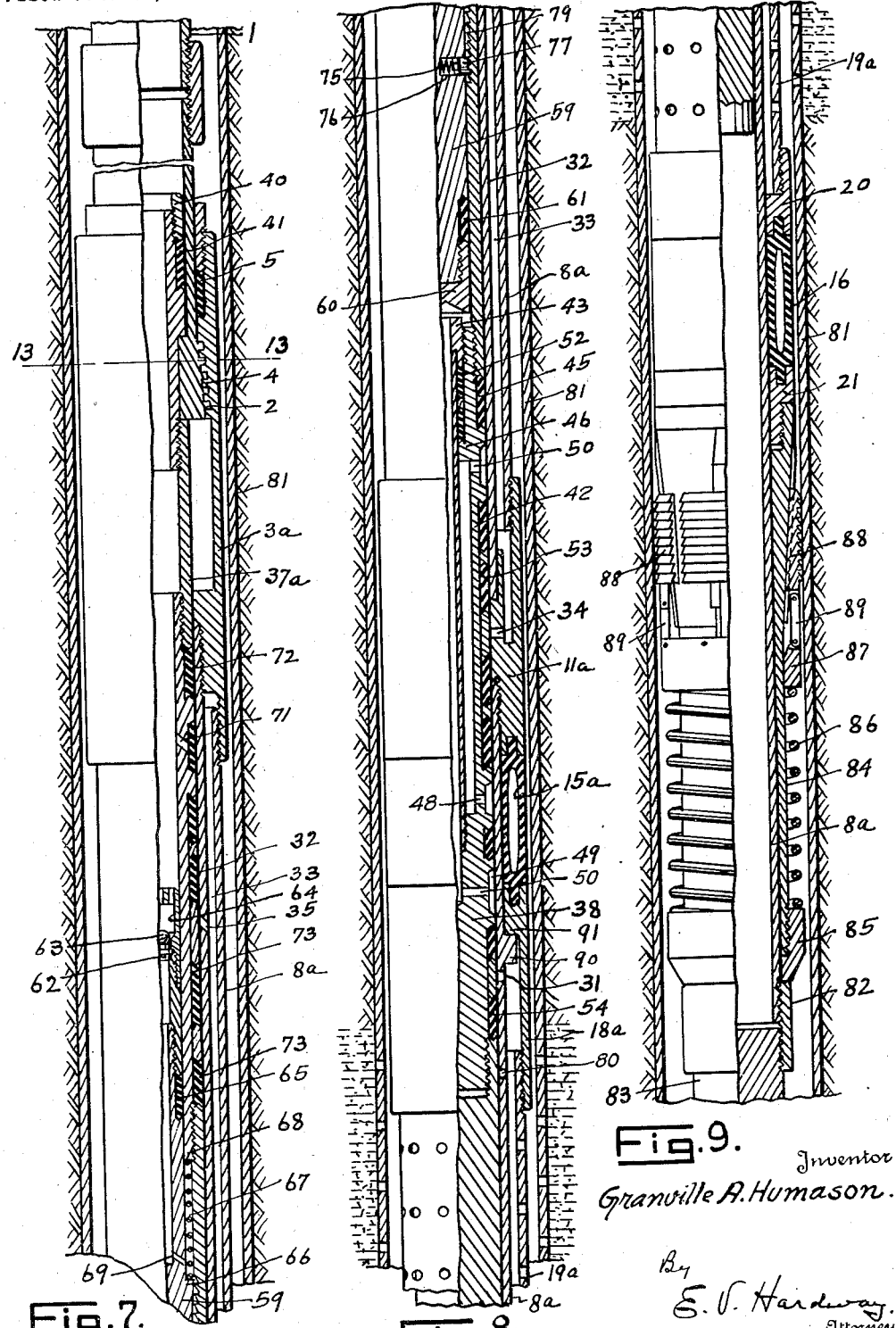
Figures 7, 8 and 9 are side elevational views, partly in section, of the upper, intermediate and lower portions, respectively, of the tool in inactive position for going into or being withdrawn from a well having a casing therein.
Figures 13, 14:
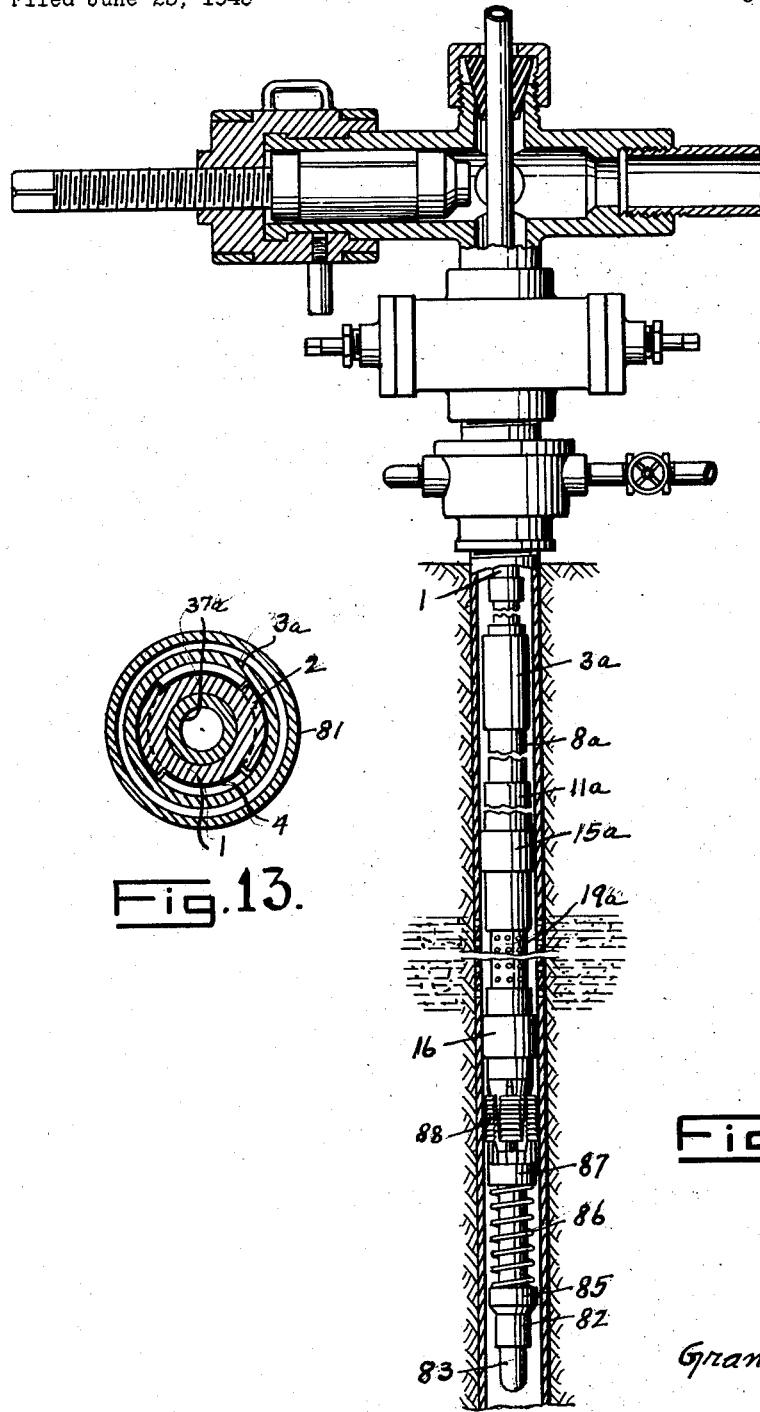
Figure 13 is a cross-sectional view on the line 13—13 of Figure 7.
Figure 14 is a side elevational view of the complete tool as set in a cased well for making a test and showing the associated well head equipment partly in section.

There are the wedge shaped slips 88 arranged around the flared portion of the expander and whose outer surfaces are toothed. They are connected to the ring 87 by means of the links 89 which are pivoted to the ring 87 as well as to the slips. These slips have slidable, dovetailed connections with the flared portion of the expander and the slips are normally in their lower, downward and inward position, while going into the well so that they will not engage the casing, as shown in Figure 9. The upper end of the expander 84 is screwed on to the lower end of the coupling 21 which is attached to the lower end of the lower packer 16. In this embodiment of the invention the coupling 20 to which the upper end of the packer 16 is secured is connected to the lower end of the perforated nipple 19a which corresponds to the nipple 19 of Figures 1 to 6, inclusive.

The upper end of the perforated nipple 19a is connected to a coupling 18a to which the lower end of the upper packer 15a is secured said upper packer corresponding to the packer 15, shown in Figure 5. Incorporated into the pipe 8a there is an externally thickened portion 11a to which the upper end of the packer 15a is secured. The packer support 12 of Figures 1 to 6, inclusive, is omitted from the embodiment illustrated in Figures 7 to 12, inclusive, and the upper and lower packers 15a and 16 are supported internally by the string of pipe, or jacket, 8a.

In other respect than hereinabove pointed out the form shown in Figures 7 to 12, inclusive, is substantially the same as the form shown in the Figures 1 to 6, inclusive.

This embodiment of the tool may be assembled, as shown in Figures 7 to 9, inclusive, and let down into the well to the desired point. The tool may then be suddenly dropped and the inertia of the assembly comprising the ring 87 and slips 88 will cause said slips to move outwardly into engagement with the casing 81 as the expander moves downwardly relative to the slips so that the tool will be anchored in the well. Upon further lowering of the tool the upper and lower packers will be subjected to an endwise compressive force and they will be expanded, as shown in Figures 11 and 12, to form a seal with the well casing 81 above and below the perforations in said casing. Thereupon the operating string may be turned to disengage the mutilated threads 2 from the corresponding threads 4 and the inside string of pipe 37a, which corresponds to the pipe 37 in Figures 1 to 6, inclusive, will be lowered relative to the inner liner 32 so as to cause the registration of the ports 31, 48 and the ports 34, 50 as well as the ports 35, 71, as explained in connection with Figures 1 to 6, inclusive, and the fluid may flow in from the formation being tested up into the operating string 1, following the course indicated by the arrows in Figures 10, 11 and 12 and if the pressure is sufficient the fluid may flow on through the string 1 to the ground surface or such fluid may be entrapped in the operating string.

When the test has been completed the operating string 1 may be elevated and, if desired, the threads 2 and 4 reconnected and a sample thus entrapped in the operating string 1 as well as entrapped and isolated in the sample chamber 33.

The tool may then be withdrawn to the ground surface and broken up for inspection of the sample.

In withdrawing the tool the coupling 82 will engage with the lower end of the collar 85 and also an external, annular, rib 90 on the string of pipe 8a will engage underneath an inside shoulder 91 of the coupling 18a so that the tool will be maintained in assembled relation while being withdrawn from the well.

What I claim is:

1. Apparatus for obtaining samples of the fluid content of the earth formation traversed by a bore hole comprising, a support slidably connected to an operating string and adapted to be lowered into a bore hole and including inner and outer spaced tubular walls, a packer assembly around said support, said assembly including an upper packer secured to said support for longitudinal movement therewith, a lower packer slidable on said support, and a perforated nipple connecting said packers, means carried by said support and engageable with said bore hole for arresting downward movement of said lower packer to expand said packers by downward movement of said support when said packer assembly has reached the desired location in the bore hole to seal off an area of the wall of the bore hole between said packers, said outer wall having perforations opposite said perforated nipple, said inner and outer walls defining a lower passage between said packers in communication with said area through said perforations in said outer wall and said nipple and an upper passage above said upper packer, said inner wall having spaced openings therein communicating with said passages, a sleeve valve slidable in said support and connected to said operating string for movement therewith, said valve having a channel therein and spaced ports opening from said channel, said valve also having a port opening into said string, said valve in one position being disposed with said ports registering with said openings to establish communication for the flow of fluid from said area through said passages and said channel into said string and said valve in another position closing said openings to entrap a sample of said fluid in said channel and in said upper passage.

2. Apparatus for obtaining samples of the fluid content of the earth formation traversed by a bore hole comprising, a support releasably connected to an operating string for sliding movement relative thereto and adapted to be lowered into a bore hole, said support including inner and outer spaced tubular walls, a packer assembly around said support, said assembly including an upper packer secured to said support for longitudinal movement therewith, a lower packer carried by said support and moveable longitudinally relative thereto, and a perforated nipple connecting said packers, means carried by said support and engageable with said bore hole for arresting downward movement of said lower packer to expand said packers by downward movement of said support when said packer assembly has reached the desired location in the bore hole to seal off an area of the wall of the bore hole between said packers, said outer wall having perforations opposite said perforated nipple, said inner and outer walls defining a lower passage between said packers in communication with said area through said perforations in said outer wall and said nipple and an upper passage above said upper packer, said inner wall having spaced openings therein communicating with said passages, an inner tubular part slidably engaging said inner wall and connected to said operating string for movement therewith relative to said support, said inner part having a channel therein and spaced ports opening from said channel and said inner part having a port opening into said string, said inner part in one position being disposed with said ports registering with said openings to establish communication for the flow of fluid from said area through said passages and said channel into said string and said inner part in another position closing said openings to entrap a sample of said fluid in said channel and in said upper passage.

3. Apparatus for obtaining samples of the fluid content of the earth formation traversed by a bore hole comprising, a support releasably connected to an operating string for sliding movement relative thereto and adapted to be lowered into a bore hole, said support including inner and outer spaced tubular walls, a packer assembly around and carried by said support, said assembly including longitudinally spaced packers, one of said packers being secured to said support for movement therewith, the other of said packers being moveable longitudinally of said support, and a perforated nipple connecting said packers, means carried by said support and engageable with said bore hole for arresting movement of said moveable packer with relation to said bore hole to expand said packers by longitudinal movement of said support when said packer assembly has reached the desired location in the bore hole to seal off an area of the wall of the bore hole between said packers, said outer wall having perforations opposite said perforated nipple, said inner and outer walls defining a discontinuous passage in communication at one end with said area through said perforations in said outer wall and said nipple, said inner wall having spaced openings communicating with said passage, one of said openings being located adjacent the upper end of said passage, an inner tubular part slidably engaging said inner wall and connected to said operating string for movement therewith relative to said support when said operating string is released from said support, said inner part having a channel therein and spaced ports opening from said channel and said inner part having a port opening into said string, said inner part in one position being disposed with said ports registering with said openings to establish continuity of said passage for the flow of fluid from said area through said passage and said channel into said string, and said inner part in another position closing said openings to entrap a sample of said fluid in said channel and in said passage.

4. Apparatus for obtaining samples of the fluid content of the earth formation traversed by a bore hole comprising, a support releasably connected to an operating string for sliding movement relative thereto and adapted to be lowered into a bore hole, said support including inner and outer spaced tubular walls, a packer assembly around said support, said assembly including an upper packer secured to said support for longitudinal movement therewith, a lower packer carried by said support and moveable longitudinally relative thereto, and a perforated nipple connecting said packers, means carried by said support and engageable with said bore hole for arresting downward movement of said lower packer to expand said packers by downward movement of said support when said packer assembly has reached the desired location in the bore hole to seal off an area of the wall of the bore hole between said packers, said outer wall having perforations opposite said perforated nipple, said inner and outer walls defining a lower passage between said packers in communication with said area through said perforations in said outer wall and said nipple and an upper passage above said upper packer, said inner wall having spaced openings therein communicating with said upper passage and said inner wall also having an opening therein communicating with said lower passage, an inner tubular part slidably engaging said inner wall and connected to said operating string for movement therewith relative to said support, said inner part having a channel therein and having spaced intermediate ports opening from said channel, said inner part also having an upper port opening into said string and a lower port opening into the inside of said inner member, pressure indicating plunger means in said inner part above said lower port, said inner part in one position being disposed with said intermediate ports and said upper port in registration with said openings to establish communication for the flow of fluid from said area through said passages and said channel into said string, and said inner part in another position being disposed with said upper ports and intermediate ports closed to entrap a sample of said fluid in said channel and in said upper passage and with said lower port in registration with the opening in said lower passage to establish communication for the flow of fluid from said area into the inside of said inner part beneath said pressure indicating plunger means.

GRANVILLE A. HUMASON.

REFERENCES CITED

The following references are of record in the file of this patent:

UNITED STATES PATENTS

| Number | Name | Date |
|---|---|---|
| 2,107,655 | Vogt et al. | Feb. 8, 1938 |
| 2,189,919 | Moore | Feb. 13, 1940 |
| 2,222,829 | Humason et al. | Nov. 26, 1940 |
| 2,265,098 | Bettis | Dec. 2, 1941 |